United States Patent Office 3,822,219
Patented July 2, 1974

3,822,219
CATALYST COMPOSITION
Conrad W. Kamienski, Gastonia, N.C., and Jerome F. Eastham, Memphis, Tenn., assignors to Gulf Resources & Chemical Corporation, Houston, Tex.
No Drawing. Original application July 13, 1970, Ser. No. 57,820, now Patent No. 3,742,077, dated June 26, 1973. Divided and this application Aug. 30, 1972, Ser. No. 284,778
Int. Cl. B41j
U.S. Cl. 252—431
19 Claims

ABSTRACT OF THE DISCLOSURE

Hydrocarbon-soluble organometallic complexes of metals of Groups I and IIa of the Periodic System, exemplified by complexes of di-$n$-butylmagnesium with $n$-butyllithium or $n$-butylpotassium, said complexes being useful as anionic catalysts in connection with polymerizations of monomers such as, for instance, those of conjugated dienes exemplified by isoprene and of 1,3-butadiene, and as catalysts in connection with telomerizations such as, for instance, the telomerization of benzene or toluene with isoprene or 1,3-butadiene.

---

This application is a division of application Ser. No. 57,820, filed July 13, 1970, now Pat. No. 3,742,077, dated June 26, 1973.

This invention relates to the preparation of novel hydrocarbon-soluble organometallic complexes of metals of Groups I and IIa of the Periodic System. It is especially concerned with the production of complexes of diorganomagnesium compounds with organometallic compounds of metals of Group I of the Periodic System.

In our copending application, Ser. No. 728,838, filed May 13, 1968, now abandoned, on which Pat. No. 3,646,231, dated Feb. 29, 1972 issued as a divisional application, we have disclosed various complexes of diorganomagnesiums with various organometallic compounds of metals of Group I of the Periodic System, illustrative of such complexes being di-$n$-butylmagnesium complexed with alkyllithiums such as sec-butyllithium and $n$-butyllithium. Primary, linear dialkylmagnesium compounds are normally insoluble in liquid hydrocarbon solvents, whereas secondary and tertiary as well as certain primary non-linear dialkylmagnesium compounds are generally quite soluble in liquid hydrocarbon solvents. In our said copending application, we have disclosed that alkyllithiums which may be represented by the formula RLi where R is alkyl, when complexed with hydrocarbon-insoluble diorganomagnesiums, which may be represented by the formula RR'Mg where R and R' are the same or different organo radicals, produce complexes which are soluble in various liquid hydrocarbon solvents. The complexes are disclosed in our said copending application as useful for a number of purposes, among which are as catalysts in certain types of polymerization and telomerization reactions.

In the procedures described in our aforementioned copending application, referring, by way of illustration, to the preparation of a complex of di-$n$-butylmagnesium with sec-butyllithium and $n$-butyllithium, the di-$n$-butylmagnesium is initially produced by a procedure involving utilizing an "activated" powdered, anhydrous MgCl$_2$ and wherein powdered anhydrous MgCl$_2$ is mixed with anhydrous benzene, anhydrous ethyl ether is added, followed by the addition of $n$-butyllithium in benzene. After cooling, allowing the mixture to come to room temperature, stirring for 14 to 16 hours, separating the supernatant, adding additional $n$-butyllithium in benzene and distilling and heating, a slurry is recovered containing the di-$n$-butylmagnesium. The slurry is then mixed with sec-butyllithium in cyclohexane and $n$-butyllithium in a mixture of hexane and cyclohexane and, after mixing well, the mixture is subjected to centrifugation. A solution of a complex results of di-$n$-butylmagnesium with sec-butyllithium and $n$-butyllithium.

The procedures for producing the complexes described in our copending application, while effective, are relatively cumbersome and time-consuming. In accordance with our present invention, various additional discoveries and improvements have been made. Certain of such additional discoveries and improvements reside in simplified methods of preparing hydrocarbon-soluble complexes of diorganomagnesium compounds with alkyllithiums. Others reside in the disclosure of many additional novel complexes of diorganomagnesiums with various organometallic compounds of metals of Group I of the Periodic System. Still others center about the uses of said complexes in various polymerizations and telomerizations, all as is described in detail below.

In general terms, the improved methods of the present invention for producing the diorganomagnesium complexes fall into two categories.

In the first method, illustrated by the production of a complex of a hydrocarbon-insoluble primary, linear dialkylmagnesium with an alkyllithium, a hydrocarbon-soluble mixed dialkylmagnesium complex is formed. The primary, linear dialkylmagnesium compound is prepared directly in the hydrocarbon solvent from magnesium metal and the corresponding alkyl halide by known methods. Then, an amount of a secondary or tertiary alkyllithium equivalent to form 5 to 100% of the primary, linear dialkylmagnesium compound formed in the first step is added to react with the by-product MgCl$_2$ formed in the direct preparation step. The resulting liquid solution is separated from the solids and said liquid solution containing a complex of a primary dialkylmagnesium with a secondary or tertiary dialkylmagnesium is then complexed with $n$-butyllithium or other Group I metal organic compounds.

In the second method, any desired alkyllithium is added in sufficient quantity to both react with all of the by-product MgCl$_2$ and also to form a complex with the so-prepared dialkyl magnesium compound, for example:

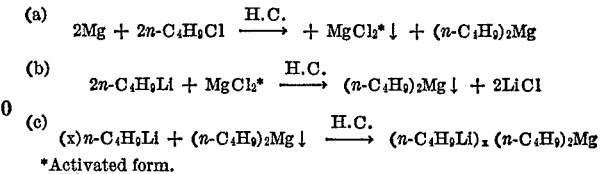

(a)  $2Mg + 2n\text{-}C_4H_9Cl \xrightarrow{\text{H.C.}} + MgCl_2^* \downarrow + (n\text{-}C_4H_9)_2Mg$ (b)  $2n\text{-}C_4H_9Li + MgCl_2^* \xrightarrow{\text{H.C.}} (n\text{-}C_4H_9)_2Mg \downarrow + 2LiCl$ (c)  $(x)n\text{-}C_4H_9Li + (n\text{-}C_4H_9)_2Mg \downarrow \xrightarrow{\text{H.C.}} (n\text{-}C_4H_9Li)_x \cdot (n\text{-}C_4H_9)_2Mg$

*Activated form.
+Hydrocarbon solvent.

This treatment results in the formation of a hydrocarbon-soluble organolithium-diorganomagnesium complex. The term "$x$" in equation (c) above can vary from 0.5 to 10 or even higher if desired, but generally will not be greater than 5. Preferred mole ratios of organolithium to diorganomagnesium are from 0.5 to 2 moles of the organolithium to 1 mole of the diorganomagnesium.

The hydrocarbon-soluble diorganomagnesium complexes derived from the practice of the first method can be utilized as solubilizing agents for other hydrocarbon-insoluble organometallics of Group I metals such as $n$-butylsodium and $n$-butylpotassium in hydrocarbon media. For example, admixture of one molar equivalent of a hydrocarbon-soluble $n$-butyl-sec-butylmagnesium (in a mixture of benzene and hexane) formed as described above, with solid $n$-butylsodium immediately causes dissolution of the $n$-butylsodium to produce the desired hydrocarbon-soluble complex. Apparently a 1:1 molar complex is favored since only about one molar equivalent of n-butylsodium is dissolved even in the presence of an excess of this reagent.

The novel preparation methods described above enable the ready preparation of novel hydrocarbon solutions of diorganomagnesium complexes of alkali metal alkyls. Thus, not only binary systems, such as R₂Mg·RLi or R₂Mg·RNa, but, also, ternary complexes, such as R₂Mg·RLi·RNa can be produced. Such ternary complexes, in contradistinction to some of the binary systems described above, are not necessarily stoichiometric and many different hydrocarbon-soluble complexes with varying ratios of Mg:Li:Na can be prepared.

The advantages of both the hydrocarbon-soluble binary and ternary organometallic complexes of Groups I and IIa are many. First of all, such complexes allow for the greater ease of handling of normally hydrocarbon-sinsoluble organomagnesium and organoalkyli reagents, such as di-n-propylmagnesium, di-n-butylmagnesium, n-butylsodium, n-amylpotassium and the like. These latter compounds are all highly pyrophoric in the solid state and must be handled in a dry box.

The hydrocarbon solutions of their binary and ternary complexes, on the other hand, can readily be dispensed from glass bottles fitted with rubber septa, by means of hypodermic syringes, without the danger of instant flammability inherent in the solid organometallics. Another advantage to be found in the hydrocarbon solutions of the complexes is their high degree of stability relative to the uncomplexed solid reagents, such as alkylsodium and alkylpotassium reagents. These reagents are known to be highly unstable even at ambient temperatures, decomposing within a few days to unsaturates and alkali hydrides, and often unwanted rearrangements occur.

The Group IIa components of the complexes made in accordance with the present invention exert a moderating effect on the Group I components both in conferring stability on them and in decreasing their reactivity in polymerization and telomerization reactions. For example, in the latter process, use of an organo-alkali reagent alone such as n-butylsodium or n-butylpotassium, as a catalyst, results in its early destruction by competing reactions of metalation of the conventionally accompanying cocatalyst Lewis base and its subsequent cleavage. These competing reactions thus destroy the catalyst and substantially decrease the yield of telomer. On the other hand, complexation of these reagents with diorgano-magnesium reagents stabilizers them toward competing reactions during telomerization and yields of telomers are substantially improved.

As indicated above, in connection with alkali metal alkyls, such as alkyllithiums and alkylsodiums, and the same is true of complexes of alkyllithiums and alkylsodiums, exemplified by n-butyllithium and n-butylsodium, such have been conventionally prepared in ethers, such as diethyl ether and tetrahydrofuran. However, said alkali metal alkyls and their complexes react with ethers, in some cases rather readily, and, therefore, they are relatively unsatisfactory. In sharp contrast, our complexes are not only novel but they are formed and, particularly, are used in the presence of major quantities of liquid hydrocarbon solvents, and, therefore, such unwanted side reactions are avoided. The presence of small proportions of Lewis base ethers or aliphatic tertiary amines is not excluded in the practice of our invention where telomers are produced, although, generally, it is not necessary to employ them.

It is particularly advantageous to utilize, as the Group IIa organometallic compounds of the compositions or complexes or the like, when such are used in the production of telomers, (a) dialkylmagnesiums in which each alkyl contains from 3 to 6 carbon atoms, with (b) $C_3$–$C_6$ alkylmetallic compounds in which the metals of said alkylmetallic compounds are Group I metals, namely, one or more from group of lithium, sodium, potassium, rubidium and cesium, especially the n-butylmetallic compounds. However, in one aspect of the broader phases of the invention, the Group I and Group IIa organometallic compounds employed in the production of the compositions or complexes or the like can comprise $C_2$–$C_{14}$ hydrocarbon organo radicals, said organo radicals being, for instance, cycloalkyl, cycloalkenyl-alkyl, aryl-alkyl, arylcycloalkyl, cycloalkylaryl, and the like. Still other types of organo radicals that can be used are those of heterocyclic character, such as 2-pyridyl and 2-thienyl; ethylenically unsaturated organo radicals such as vinyl, allyl and propenyl; polyfunctional organo radicals such as alkylene and polymethylenes as, for example, 1,4-tetramethylene and 1,5-pentamethylene.

Many of the said binary organometallic complexes can be represented by the formula $$x(RM) \cdot y(R^1R^2M^1)$$

where R, $R^1$ and $R^2$ are the same or dissimilar $C_2$–$C_{14}$ hydrocarbon organo radicals; M is a Group I metal, $M^1$ is a Group IIa metal; and $x$ and $y$ are integers reflecting the molar ratios of the respective organometallic compounds comprising the compositions or complexes, the values of $x$ and $y$ commonly involved being indicated hereafter. Illustrative examples of said hydrocarbon organo radicals, in addition to those previously mentioned, are n-propyl; n-butyl; sec-butyl; n-amyl; tert-amyl; n-octyl; n-undecyl; n-decyl; n-dodecyl; 2-methyl-2-butenyl; cyclopentyl-methyl; cyclohexyl-ethyl; cyclopentyl-ethyl; methyl; methylcyclopentyl-ethyl; 4-cyclohexenyl-ethyl; alpha-naphthyl-ethyl; cyclopentyl; cyclohexyl; methylcyclopentyl; dimethylcyclopentyl; ethylcyclopentyl; methcyclohexyl; dimethylcyclohexyl; ethylcyclo-hexyl; isopropylcyclohexyl; phenylethyl; phenylcyclohexyl; phenyl; tolyl; xylyl; benzyl; naphthyl; methylnaphthyl; dimethylnaphthyl; ethylnaphthyl; cyclohexylbutyl; 2,7 - dimethylocta-2,6-dien-1,8-yl; 2,6-dimethlyocta-2,6-dien-1,8-yl; and bis (α-2-methylbutyl-)-m-xylyl.

Hydrocarbon-soluble complexes are formed by combination of (a) Group I organometallics such as alkyllithium, alkylsodium, alkylpotassium, alkylrubidium and alkylcesium, examples of which are n-butyllithium, sec-butyllithium, n-butylsodium and n-amylpotassium; aryllithium, arylsodium, arylpotassium compounds, examples of which are phenyllithium, 2-naphthylsodium, and 9-anthrylpotassium; chain extended dialkali metal adducts of conjugated dienes such as the chain extended dilithioadducts and dipotassioadducts of isoprene of 1,3-butadiene and of 1,3-divinylbenzene (see U.S. Pats. Nos. 3,294,768; 3,388,178 and 3,468,970) some of which adducts can be represented by the formulae $C_{10}H_{14}Li_2$ and $C_{10}H_{14}K_2$; and aralkyllithium, aralkylsodium and aralkylpotassium compounds, examples of which are benzyllithium, diphenylmethylsodium and α-cumylpotassium, with (b) Group IIα organometallics, such as dialkylmagnesium, dialkylberyllium and dialkylcalcium compounds, examples of which are di-n-butylmagnesium, n-butyl-sec-butylmagnesium, n-amyl-sec-butylmagnesium, di-n-propylberyllium, n-butyl-sec-butyl-beryllium, di-n-butylcalcium and n-amyl-sec-butylcalcium; and arylalkylmagnesium, arylalkylberyllium and arylalkylcalcium compounds, examples of which are phenyl-sec - butyl - magnesium, naphthyl-sec-butylberyllium and p-tolyl-sec-amylcalcium; and aralkylalkylmagnesium, beryllium and calcium compounds, examples of which are benzyl-sec-butylmagnesium, p-methylbenzyl-sec-amylberyllium, and diphenylmethyl-sec-butylcalcium, and corresponding compounds where the Group IIa metal is barium or strontium. Ternary complexes may be formed by admixture of any two Group I organometallics with one Group IIa organometallic, or vice versa.

Specific illustrative examples of complexes falling within the scope of our invention are the following, omitting the molar ratios of the Group I and Group IIa organometallics making up said complexes.

(1) n-BuLi·(sec-Bu)₂Ca
(2) PhLi·(sec-Bu)₂Mg
(3) TolylLi·n-(Am)₂Mg·(sec-Bu)₂Mg
(4) sec-BuLi·(sec-Bu)₂Be
(5) BenzylLi·(sec-Bu)₂Mg
(6) n-BuLi·(sec-Am)₂Mg·(sec-Bu)₂Ca
(7) C₁₀H₁₄Li₂·(sec-Bu)₂Mg
(8) C₁₀H₁₄Li₂·C₁₀H₁₄K₂·(sec-C₅H₁₁)₂Mg
(9) C₁₀H₁₄Li₂·C₁₀H₁₄K₂·(sec-Am)₂Mg
(10) C₁₀H₁₄Li₂·n-BuLi·(sec-Bu)₂Mg
(11) (n-C₅H₁₁)Mg·(sec-C₄H₉)₂Mg·(sec-C₄H₉Li)
(12) (n-C₄H₉)₂Mg·(n-C₄H₉K)
(13) (sec-C₄H₉)₂Mg·(n-C₄H₉Na)
(14) [2(n-C₅H₁₁)₂Mg·(sec-C₄H₉)₂Mg]·(n-C₄H₉Na)

Molar ratios of the Group I and IIa organometallics in the binary and ternary complexes may be varied over a wide range, but the most practical limits are usually from about 0.1 to 100, and, more desirably, from about 0.5 to 5.

As indicated above, the aforesaid compositions or complexes are employed in the form of solutions thereof in one or more liquid hydrocarbon solvents. Among such solvents are, by way of illustration, aliphatic and cycloaliphatic solvents such as heptane, hexane, octane, isooctane, cyclohexane and methylcyclohexane; but particularly desirable are aromatic hydrocarbons such as benzene, toluene, xylenes, and compatible mixtures of any two or more thereof. It will be understood, of course, that the different complexes will have varying solubilities in different liquid hydrocarbon solvents. However, in general, they will be found to be soluble to a substantial extent in at least most of said liquid hydrocarbon solvents to produce clear solutions.

It has been found that, although dialkylmagnesium reagents, or other dialkylmetallics of metals of Group IIa of the Periodic System, alone do not catalyze the polymerization of conjugated dienes, in combination with lithium alkyls, or other Group I metal alkyls, they act as catalysts to produce polymers of predictable molecular weight. Thus, for example, 1,3-butadiene and isoprene can be polymerized in quantitative yield with alkyllithium-dialkylmagnesium complexes wherein the alkyllithium is present in at least an equimolar amount to the dialkylmagnesium reagent. The polymer molecular weight corresponds to the utilization of all the carbon-lithium bonds and most of the carbon-magnesium bonds in the catalyst, thus definitely showing that magnesium participates in the growing polymer chain.

In polymerization reactions carried out utilizing the catalysts of the present invention, the polymers which can be produced are homopolymers as well as copolymers. The monomers, which most desirably contain from 4 to 12 carbon atoms, that can be employed are conjugated dienes and vinyl-substituted aromatic compounds which, conveniently, are generically referred to herein as monomers. They include, by way of illustration, butadienes such as 1,3-butadiene; isoprene; piperylene; styrene; α-methylstyrene; 1,4-divinyl-benzene; 1 - vinylnaphthalene and 2-vinylnaphthalene. Numerous others are well known to the prior art and are shown, for instance, in U.S. Pats. Nos. 3,091,606 and 3,377,404, the disclosures of which, in relation to conjugated dienes and vinyl-substituted aromatic compounds, are hereby incorporated by reference. Monoolefins can also be effectively polymerized with the catalyst systems of the present invention. Such monoolefin monomers include, for instance, ethylene, propylene, 1-butene, 2-butene, isobutene and higher molecular weight monoolefins.

With regard to the telomerization reactions which are carried out utilizing the catalysts of the present invention, the telogens which are used are aromatic compounds, especially aromatic hydrocarbon compounds containing at least one hydrogen capable of being replaced by a metal atom but devoid of any other substituents as, for instance, hydroxyl, chlorine, bromine, iodine, carboxyl, and nitro, which substituents are reactive with the catalyst systems of the present invention. Illustrative examples of such telogens are benzene, $C_1$–$C_4$ mono-, di- and trialkyl benzenes exemplified by toluene, ethylbenzene, n-propylbenzene, isopropylbenzene, o-, m- and p-xylenes; 1,3,5-trimethylbenzene; n-, sec- and tert-butylbenzenes; cyclohexylbenzene; alkyl, notably $C_1$–$C_4$, and cycloalkyl substituted polycyclic aromatic compounds exemplified by 1,2,3,4-tetrahydronaphthalene, 1-methylnaphthalene, 1-isopropylnaphthalene, 1,3-diisobutylnaphthalene; and 1-cyclohexylnaphthalene; alkoxy-aromatic compounds exemplified by anisole; 1,3-dimethoxylbenzene; mono-propoxybenzene; 1-methoxynaphthalene and 1,3-dimethoxynaphthalene; dialkylamino-aromatic compounds, notably those in which the alkyl is $C_1$–$C_4$, exemplified by dimethylaminobenzene; 1,3-bis-(diisopropylaminobenzene) and 1-dimethylaminonaphthalene. Especially satisfactory is toluene.

The taxogens which are reacted with the telogens to produce telomers are advantageously monomeric conjugated dienes, vinyl-substituted aromatic compounds, and monoolefins, illustrative examples of which have been set forth above, in U.S. Pats. Nos. 3,091,606 and 3,377,404, and of which 1,3-butadiene is especially satisfactory as the monomeric conjugated diene, styrene and α-methylstyrene as the vinyl-substituted aromatic compounds, and ethylene and propylene as the monoolefins.

The compositions or complexes formed, for instance, from the dialkylmagnesium, such as di-n-butylmagnesium, with alkylpotassiums, such as n-butylpotassium, are especially satisfactory as catalysts for telomerization of conjugated diene hydrocarbons, notably 1,3-butadiene. The resulting butadiene telomers have an unusually high percentage of unsaturation (commonly in excess of 95%) coupled with a relatively low viscosity for the same molecular weight range. Unsaturation is essentially mainly of the vinyl and trans-1,4 types (little or no cis-1,4). Cyclic structures, as depicted above, are generally very low (less than 5%), apparently due to the high proportion of trans-1,4-linkages which result from the practice of this aspect of the present invention. Table I shows such relationships, and Table II shows the corresponding properties of such telomers.

TABLE I.—MICROSTRUCTURE OF 1,3-BUTADIENE TELOMERS

| Catalyst type | Percent of— | | | |
|---|---|---|---|---|
| | Vinyl | Trans-1,4 | Cis-1,4 | Saturated |
| n-Butyllithium | 68.9 | 7.6 | 0.0 | 23.5 |
| RR'Mg-n-BuNa ᵃ | 76.0 | 13.0 | 7.3 | 3.7 |
| RR'Mg-n-BuK ᵇ | 55.0 | 45.0 | 0.1 | 0.0 |

ᵃ R=sec-Bu, R'=n-Amyl; product contained approximately 7 mole percent RLi.
ᵇ R=sec-Bu, R'=n-Amyl; product contained approximately 10 mole percent RLi.

TABLE II.—PHYSICAL PROPERTIES AND YIELDS OF 1,3-BUTADIENE TELOMERS

| Catalyst type | Viscosity, poise (P) | Molecular weight | Yield (lbs./eq.) |
|---|---|---|---|
| n-Butyllithium ᵃ | 120 P (50°), [2,000 P (23°)] | 2,130 | 27 |
| RR'Mg-n-BuNa | 744 P (23°) | 1,922 | 52.5 |
| RR'Mg-n-BuK | 189 P (26°) | 2,220 | 50.0 |

ᵃ Dilithioadduct of isoprene, prepared as described in Example 1 of U.S. Pat. No. 3,388,178 gives substantially similar result.

Note.—Reaction conditions:

| | |
|---|---|
| Toluene, ml | 400 |
| TMEDA, ml | 5 |
| Catalyst, eq | 0.034 |
| Butadiene (gas), l./m | 3.5 |
| Temperature, °C | 60–65 |
| Time, hrs | 2–2.5 |

A particular utility of the hydrocarbon-soluble complexes of the present invention is their ability to regulate the micro-structure of polymers and telomers during their use as catalysts in telomerization reactions. For example, the use of n-butyllithium in the telomerization of butadiene wth toluene, in a manner heretofore suggested by others, results in the production of telomers possessing a high degree of saturated cyclic structures, as depicted below:

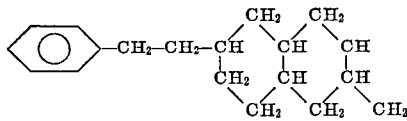

Such cyclic structures detract from the total unsaturation of these polymers and also increase their viscosity. In contrast, the benefits of a higher degree of unsaturation, resulting from the use of the complexes of the present invention, are mainly in the greater number of double bonds available for cross-linking in various curing operations, such as are involved in rubber compounding, potting, and metal coating, and in a decreased viscosity which allows for easier handling of the telomeric oils. For example, a low viscosity telomeric oil can be sprayed onto a metal surface to be coated without the aid of a thinner solvent.

In those instances in which Lewis base ethers or aliphatic tertiary amines are utilized in the reaction medium in which the telomers utilizing the complexes of the present invention are produced, illustrative examples of such ethers are linear alkyl ethers such as dimethyl ether, diethyl ether, diisopropyl ether, d-n-butyl ether and diisobutyl ether; dialkyl ethers of aliphatic polyhydric alcohols such as dimethyl ether of ethylene glycol, diethyl ether of ethylene glycol, diisopropyl ether of ethylene glycol and diisopropyl ether or diethylene glycol, and dimethyl-, diethyl- and diisopropyl ethers of propylene glycol; cyclic alkyl ethers such as tetrahydrofuran (THF), tetrahydropyran (THP), dioxane, and 7-oxa [2,2,1]-bicyclo-heptane (OBH); and liquid ethers in the form of azaoxa-alkanes, aza-alkyloxacycloalkanes or oxa-alkyl-azacycloalkanes which can be represented by the formulae:

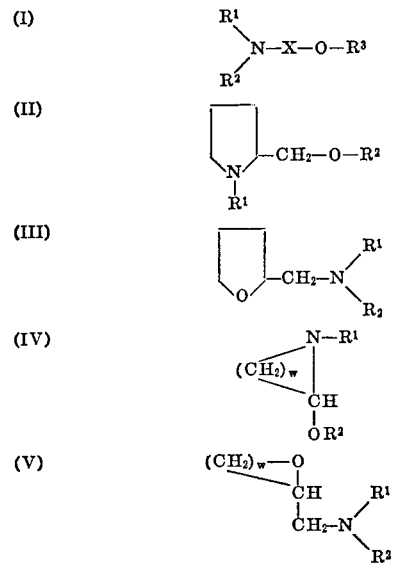

where $R^1$, $R^2$ and $R^3$ are the same or different alkyls each containing from 1 to 4 carbon atoms, namely, methyl, ethyl, n-propyl, isopropyl, n-butyl, isobutyl and tert-butyl; X is a non-reactive group such as —CH₂—CH₂—, —CH₂—CH₂—CH₂—,

—CH₂—CH—CH₂—,
     |
   CH₃ or other divalent aliphatic hydrocarbon or alkylene radicals, preferably containing from 2 to 4 carbon atoms; and w is 1 to 4. Illustrative examples of such ethers include, for instance, 2-dimethylaminoethylmethyl ether [(CH₃)₂—N—CH₂—CH₂—O—CH₃]; 2 - diethylaminoethylmethyl ether [(C₂H₅)₂—N—CH₂—CH₂O—CH₃]; and 2-dimethylaminopropylmethyl ether

[(CH₃)₂—N—CH₂—CH₂—CH₂—O—CH₃].

An illustrative dioxacycloalkane is 2,2'di (tetrahydrofuranyl)

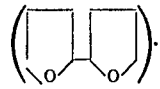

The Lewis base aliphatic tertiary amines include, by way of illustration, trimethylamine, triisopropylamine and tributylamine; and ditertiary amines such as N,N,N',N'-tetramethylethylenediamine. Other suitable Lewis base tertiary amines which can be utilized are disclosed in U.S. Pat. No. 3,206,519 and British Pat. No. 1,051,269 which, for this showing, are herewith incorporated by reference. Especially suitable, where such cocatalyst is used, are N,N,N',N' - tetramethylethylenediamine (TMEDA) and 1 - Dimethylmine - 2 - ethoxyethane(2-dimethylaminoethyl ethyl ether).

The nature of the catalyst compositions of the present invention strongly affects the molecular weight of the telomers produced. Thus, depending on the electronegative nature of E in the complex RMgE·RK, a high or low molecular weight may be obtained. This is presumably due to the ability of the catalyst component RMgE to compete favorably for RK in the presence of at least one molar equivalent of the Lewis base, e.g. TMEDA. The greater the electronegativity of E, the less tightly is RMgE bound to RK. Thus, in the following equations, $k_1 k_2 \gg k_3$.

(1)
$$\text{RMgOR·RK} + \text{TMEDA} \underset{}{\overset{k_1}{\rightleftharpoons}} \text{RMgOR·TMEDA} + \text{RK}$$

(2)
$$\text{RMgR·RK} + \text{TMEDA} \underset{}{\overset{k_2}{\rightleftharpoons}} \text{RMgR·TMEDA} + \text{RK}$$

(3)
$$\text{RMgH·RK} + \text{TMEDA} \underset{}{\overset{k_3}{\rightleftharpoons}} \text{RMgH·TMEDA} + \text{RK}$$

Thus, catalyst system (1), which consists mainly of free RK, produces low molecular weight telomers (ca. 500 or less); while, on the other hand, catalyst system (3), which consists mainly of RMgH·RK, produces high molecular weight telomers (ca. 5000 or higher).

The following examples are illustrative of the production of compositions or complexes of the present invention, and their use in polymerization and in telomerization reactions. It will be understood that other compositions or complexes can be made and other polymerizations and telomerizations carried out in the light of the guiding principles and teachings disclosed herein. All temperatures are in degrees C.

EXAMPLE I

Preparation of Di-n-Amylmagnesium-Di-sec-Butylmagnesium

This example shows the preparation of di-n-amylmagnesium-di-sec-butylmagnesium which can then be complexed with alkali metal alkyls (as note, for instance, in Example IV).

13.4 g. of —200 mesh magnesium powder was placed in a 1-liter 3-necked flask, and covered with 50 ml. of dried methylcyclohexane. Then 2 ml. of a 1.0 N solution containing a complex of 1.2 equivalents of di-n-amylmagnesium and 0.8 equivalents of di-sec-butylmagnesium in hexane-cyclohexane was added to the mixture as well as 10 ml. of a solution of 53.8 g. (0.5 moles) of n-amyl chloride in 200 ml. of methylcyclohexane. Heating and stirring was begun. At 75°, reaction commenced, as observed by a rapid rise in temperature to 88° and notable thickening of the mixture. After the reaction subsided, the remainder of the halide solution was added over a 3.5 hour period. The heating was maintained to keep the temperature of the reaction mixture at about 80° (+5°). Vigorous stirring was maintained throughout the addition. 50 ml. of solvent was then added to the mixture and heating at 80° and vigorous stirring continued for 2 hours. The mixture was allowed to cool to 60° and 30 ml. of 1.2 N sec-butyllithium (s-BuLi) in hexane added. Immediate thinning of the mixture was noted. An additional 60 ml. of said 1.2 N s-BuLi solution was added, the mixture then thinning out to the consistency of the solvent. The mixture was stirred for 1 hour and allowed to settle. The total alkalinity concentration of the clear supernatant solution was 1.09 N. An additional 75 ml. of the 1.2 N s-BuLi solution was added and the mixture stirred for 30 minutes. The mixture was then filtered to give a clear, colorless solution. The solids were washed with 100 ml. of hexane to give a total of 530 ml. of a 0.99 N solution (525 meq. of base). Subtracting a total of $165 \times 1.2$ N=198 meq. of s-BuLi, and adding 22 meq. for analytical samples, there is obtained a residual of 348 meq. of base corresponding to a 70% recovered yield of di-$n$-amylmagnesium (based on starting $n$-AmCl). The GLC ratio of 1.75 $n$-amyl to 1 sec-butyl groups in the product was determined by oxidizing a 10 ml. sample with dry air, hydrolyzing and acidifying the mixture and analyzing the supernatant solution on a Carbowax 400 column at 110° C. (No correction factor was applied.) The product solution was further analyzed for Mg by EDTA titration and active alkyl content by titration with a standard solution of sec-butyl alcohol in toluene (1,10-phenanthroline was the indicator).

Found: Mg=1.02 N, A.A=0.95 N (T.B.=0.99).

EXAMPLE II

Di-$n$-Butylmagnesium-$n$-Butyllithium Complex

To a mixture of $(n\text{-}C_4H_9)_2Mg$ and $MgCl_2$, in an inert atmosphere, prepared from $n\text{-}C_4H_9Cl$ and activated Mg metal, concentrated $n$-BuLi (95% in hexane), 1 ml. at a time, was added until base appeared in solution. At this point, all of the activated $MgCl_2$ had been reacted. Then a calculated amount of concentrated $n\text{-}C_4H_9Li$ was added to make the catalyst. When the Mg:Li ratio reached 2:1, all of the di-$n$-butylmagnesium had dissolved. Further addition of lithium led to an increase in the lithium content of the solution. By this means, various ratios can be made.

EXAMPLE III

Di-$n$-Butylmagnesium-Di-sec-Butylmagnesium Complexed with $n$-Butylsodium 1 g. of $n$-butylsodium (0.0125 moles) was shaken with a mixture of 10 ml. of a 1.48 N solution (0.0074 moles) of a complex of $n$-butylmagnesium and sec-butylmagnesium (weight ratio of said $n$-butylmagnesium to said sec-butylmagnesium is 2:1) in $n$-hexane and 6 ml. of benzene. The mixture was allowed to stand for about ½ hour. If the resulting solution is not clear, such solid as may be present can be removed by centrifugation. The clear supernatant or solution, on analysis for sodium and magnesium, showed that the same contained the butylsodium and the butylmagnesiums in a mole ratio of approximately 1:1 (Found: Na: 0.44 mmoles/ml.; Mg: 0.42 mmoles/ml.). The apparent complex may be represented by the formula $n\text{-}C_4H_9Na \cdot C_4H_9)_2Mg$.

EXAMPLE IV

Di-$n$-Amylmagnesium-Di-sec-Butylmagnesium Complexed with $n$-Butylsodium and $n$-Butyllithium To 9.6 g. (0.1 mole) of sodium tert-butoxide suspended in 50 ml. of hexane was slowly added, with stirring, a volume of 129 ml. of a 2.33 N (0.3 moles) solution of $n$-butyllithium in $n$-hexane with external cooling ($-10°$). After allowing the contents to come to room temperature, the white $n$-butylsodium was filtered off and washed with 50 ml. of hexane. To the residual solid product after washing was added 100 ml. of a 1 N solution of the complex dialkylmagnesium compound of Example 1, prepared by mixing one equivalent of di-sec-butylmagnesium in hexane with two equivalents of di-$n$-amylmagnesium in methylcyclohexane (the complex can be indicated as $[(n\text{-}Am)_2Mg]_2 \cdot (sec\text{-}Bu)_2Mg$. As the solid $n$-butylsodium dissolved in the dialkylmagnesium solution, a sticky, highly pyrophoric, liquid second phase separated out. The addition of 20 ml. of benzene dissolved this second phase to give, on filtration, 125 ml. of completely clear solution containing approximately equimolar quantities of the sodium and magnesium alkyls.

Found: 0.35 mmoles/ml. of Mg; 0.31 mmoles/ml. of Na. The solution also contained 0.048 mmoles/ml. of Li.

EXAMPLE V

Di-$n$-Butylmagnesium-Di-sec-Butylmagnesium Complex with $n$-Butyllithium and $n$-Butylsodium To 1.663 g. (0.02 moles) of $n$-butylsodium, as a solid white powder, was added 23 ml. of a 1.8 M solution of $n$-butyllithium in benzene and the mixture stirred thoroughly. To 5 ml. of this mixture was added 5 ml. of a 0.95 molar solution of mixed dialkylmagnesiums (in a weight ratio of 2 parts of di-$n$-butylmagnesium to 1 part of di-sec-butylmagnesium) in hexane. Heat was generated and most of the solids dissolved, yielding a slightly hazy, light orange solution. Centrifugation yielded a perfectly clear solution. Analysis of the solution for Na, Li and Mg gave the following results:

Calculated: Na, 1.75 mmoles; Li, 4.50 mmoles; Mg, 2.50 mmoles. Found: Na, 1.34 mmoles; Li, 4.34 mmoles; Mg, 2.74 mmoles.

The ternary complex (containing approximately 3Li:2Mg:1Na)

produced a solution of 2.26 Normal in total alkalinity, which was stable at ambient and refrigerated temperatures.

To demonstrate the non-stoichiometry of these complexes, another combination of the three butylmetallics was made as described above, yielding, ultimately a clear, stable, 2.41 N benzene solution containing a molar ratio of 1.67 Mg:1.67 Li:1Na.

EXAMPLE VI

Di-$n$-Amylmagnesium-Di - sec - Butylmagnesium Complexed with $n$-Butyllithium and $n$-Butylpotassium To a slurry of 11.2 g. (0.1 mole) of potassium tert-butoxide in 50 ml. of cyclohexane was added slowly, with stirring and ice-bath cooling, 150 ml. of a 2.5 N $n$-butyllithium solution in hexane. (3.3 molar equivalents). The temperature during reaction did not rise above 25°. The resultant mixture was filtered and the solids washed with $n$-pentane. The white solids appeared to be somewhat unstable, darkening to a light brown color after several days storage in the Dry Box at room temperature. The filtrate components were also unstable, a red-brown solid precipitating out slowly. Both solids and filtrate were analyzed for K and Li.

Found in filtrate (total): Li, 244 meq; K, 19 meq. Found in solid (1–15 g. sample): Li, 11 meq; K, 6.1 meq.

To the remainder of the solid (approximately 2:1 BuLi-Buk complex) was added 190 ml. of a 1.07 N solution of a complex formed by admixing 1.5 equivalents of di-$n$-amylmagnesium in cyclohexane and 1 equivalent of di-sec-butylmagnesium in hexane. 50 ml. of cyclohexane was added; the mixture shaken thoroughly and a 40 ml. aliquot was transferred to a centrifuge tube. After spinning the mixture down, a 10 ml. aliquot of the supernatant was analyzed for Li, K and Mg.

Found: Li, 0.28 mmoles/ml.; K, 0.06 mmoles/ml.; Mg, 0.21 mmoles/ml.

To the remaining mixture in the centrifuge tube was added 10 ml. of benzene. Most of the remaining solid dissolved. Further addition of 5 ml. benzene did not result in any further solubilization of the solids. After spinning the mixture down, a 10 ml. of aliquot of the clear supernatant solution was analyzed for K, Li and Mg.

Found: Li, 0.21 mmoles/ml.; K, 0.12 mmoles/ml.; Mg, 0.26 mmoles/ml.

Mg had been dissolved from the solids by addition of benzene. Most of the remaining hexane-cyclohexane slurry of the ternary alkylmetallic salt mixture was transferred to centrifuge tubes and spun down. The supernatant was discarded and the solids washed twice with 25 ml. portions of hexane. Then, 25 ml. of benzene was added to each of the tubes and the mixture shaken thoroughly. Most of the solids dissolved. The tubes were centrifuged and the yellow clear supernatant solution analyzed for Li, K and Mg.

Found: Li, 0.072 mmoles/ml.; K, 0.269 mmoles/ml.; Mg, 0.353 mmoles/ml.

EXAMPLE VII

Di-*n*-Butylmagnesium-Di-*sec*-Butylmagnesium Complexed with *n*-Butylsodium

To 13 ml. of a 1.23 N solution of a complex formed from 2 equivalents of di-*sec*-butylmagnesium in hexane and 1 equivalent of di-*n*-butylmagnesium in cyclohexane were added 8 ml. of benzene and 1 to 2 g. of *n*-butylsodium (excess). The mixture was shaken well, spun down in the centrifuge, and the clear supernatant analyzed for Mg and Na.

Found: 0.48 mmoles/ml. Na; 0.39 mmoles/ml. Mg (average of two results).

EXAMPLE VIII

Di-*n*-Butylmagnesium-Di-*sec*-Butylmagnesium Complexed with *n*-Butylpotassium a. To approximately 1 g. (0.01 mole) of potassium *tert*-butoxide suspended in 10 ml. of benzene in a centrifuge tube was added 25 ml. of a 1.22 N solution of a complex made up of 2 equivalents of di-*n*-butylmagnesium in cyclohexane and 1 equivalent of di-*sec*-butylmagnesium in hexane. The resulting suspension was spun down and the clear solution and solid analyzed for K and Mg.

Found in solution: K, 5.0 meq; Mg, 26.8 meq. Found in solid: K, 3.5 meq; Mg, 2.8 meq.

EXAMPLE IX

Complex of Chain-Extended Dilithioisoprene with Di-*n*-Butylmagnesium

Magnesium metal powder (6 g., 0.25 g. atoms) was reacted with neat *n*-butyl chloride (23 g., 0.5 mole) in an inert atmopshere. When the reaction mixture became viscous, 100 ml. of benzene was added slowly to thin it out. When the reaction was complete, the reaction mixture was cooled and concentrated *n*-BuLi was added in 1–2 ml. increments until a small amount of basic material remained in solution. Then a sufficient amount of a partial suspension in benzene of chain-extended dilithioisoprene was added to produce a solution with a 3:1 Li:Mg ratio. A clear red solution resulted.

EXAMPLE X

Complex of Chain-Extended Dilithioisoprene and Dimagnesioisoprene with Di-*n*-Butylmagnesium Magnesium metal powder (6 g., 0.25 g. atoms) was reacted with neat *n*-butyl chloride (23 g., 0.5 mole) in an inert atmosphere. When the reaction mixture became viscous, 100 ml. of benzene was added slowly to thin it out. When the reaction was complete, the mixture was cooled and a cloudy solution of chain-extended dilithioisoprene in benzene was added slowly. Some heat was evolved. The reaction mixture was allowed to settle and the resultant mixture was filtered. The solution was thinned out in order for the filtration to proceed at an acceptable rate. A slightly cloudy red solution resulted.

EXAMPLE XI

Complex of Butyl (*n*- and *sec*-) Potassium and Dibutyl (*n*- and *sec*-) Magnesium This Example shows the production of a binary hydrocarbon-soluble complex of a Group I alkylmetallic and a Group IIa alkylmetallic by treatment of a soluble dialkylmagnesium complex produced above with at least one molar equivalent of an alkali metal, preferably very finely dispersed in a hydrocarbon solvent and filtering the resulting solution of the said product complex of the Group I alkylmetallic and the Group IIa dialkylmetallic.

To a dispersion of 3.1 g. of potassium metal in 100 ml. of heptane was added 240 ml. of a 0.81 N solution of a 1:1 complex of di-*n*-butylmagnesium and di-*sec*-butylmagnesium in hexane-cyclohexane $(1:1)_x$ and the mixture stirred at ambient temperature for 16 hours. The product was allowed to settle out, the supernatant solution was drawn off, and the residue treated with 350 ml. of benzene. Magnesium metal and unrecated potassium metal were filtered away to give a clear solution of the 1:1 complex of butyl (*n*- and *sec*-) potassium and dibutyl (*n*- and *sec*-) magnesium in benzene. Analysis for Mg and K showed the concentration of the former to be 0.185 molar, while the concentration of the latter was found to be 0.166 molar.

EXAMPLE XII

Polymerization of 1,3-Butadiene

Into a $N_2$-purged tube was condensed 29.8 g. of 1,3-butadiene at −78°. The tube was warmed, weighed, checked for leaks, and then re-cooled. Cyclohexane (154.5 ml.) and 12 ml. of a 0.50 N solution (5.96 mmoles) of a 2:1 complex of *sec*-butyllithium and di-*sec*-butylmagnesium in hexane were then introduced. The mixture was warmed to 25°, agitated and allowed to stand overnight. The next day the reaction was quenched with 9 ml. of 2-propanol and 3-ml. of inhibitor solution was added. The solvent was then stripped under vacuum to constant weight, giving 30.1 g. (100%) of polybutadiene. The molecular weight, determined by VPO, was 3720.

EXAMPLE XIII

Polymerization of Isoprene 10 g. of isoprene, freshly dried and distilled, was dissolved in 31 ml. of cyclohexane, also previously dried and distilled, in a pressure bottle under an inert atmosphere. The bottle was sealed with a rubber septum. Then, 2 ml. (2.3 mmoles) of a catalyst solution of Example II with Li:Mg ratio=1:1, LiMg($nC_4H_9$)$_3$, was added by means of a syringe through the septum. The mixture was then heated at 65° for 24 hours, cooled, and quenched with isopropanol. After evaporation of solvent, the viscous rubber was analyzed for average molecular weight by vapor phase osmometry. ($\overline{M}n$=3200). Weight 8.3 g. (83% yield).

EXAMPLE XIV

Polymerization of 1,3-Butadiene 23.4 g. of purified 1,3-butadiene was condensed into a pressure bottle fitted with a butyl rubber septum and crown cap. Then 115.4 ml. of purified cyclohexane was injected into the bottle and the mixture shaken to effect solution. Then 14.5 ml. of a 0.84 N solution of approximately a 1:1 complex of di-*sec*-butylmagnesium (0.28 M) and *sec*-butyllithium (0.31 M) in hexane was injected and the mixture shaken thoroughly and allowed to polymerize for 66 hours. To the mixture was then added 9 ml. of isopropanol to quench the catalyst and 3 ml. of a 10 wt. percent N-phenyl-2-naphthylamine solution in THF, as an inhibitor. The product was thoroughly stripped of solvent until no further loss in weight was observed.

The viscous polymeric residue weighed 24.1 g. (100% yield) and had a molecular weight (by VPO) of 2239. This molecular weight corresponds to the utilization of all of the lithium and three-fourths of the magnesium as catalyst (10.5 meq. out of 12.2 meq.) according to the following well-known relationishp:

$$\text{Mol. Wt.} = \frac{\text{Wt. of monomer}}{\text{Equivalents of catalyst}}$$

$$\text{Substituting, } \frac{23.4 \text{ g.}}{10.5 \text{ meq.}} = 2239 \text{ (M.W.)}$$

The microstructure of the polymer was determined by infrared and NMR and found to be 45% cis-1,4: 45% trans-1,4: 10% vinyl.

EXAMPLE XV

Telomerization of 1,3-Butadiene with Toluene

To 400 ml. of toluene was added 5 ml. of TMEDA and 32 ml. of the catalyst solution of Example IV (catalyst concentration=0.08 N). Then, 1,3-butadiene was added as a gas at a flow rate of 3.5 liters/minute. The temperature rose immediately from 25 to 60° and was maintained at 60-65° throughout the reaction, with external cooling. After 1.5 hours, the catalyst ceased to function (no further absorption of butadiene) and 2 ml. of H₂O was added. The telomeric product was stripped of toluene under vacuum. The product, a pale yellow, viscous liquid (744 poise at 23°, 33 poise at 58°) with a molecular weight (VPO) of 1922, weighed 798 g., representing a yield of 52.5 lbs. per equivalent of catalyst. The microstructure of the resulting polybutadiene was determined by infra-red analysis to be as follows:

Vinyl—76.0%, cis-1,4—7.3%, trans-1,4—13.0%, saturated (cyclic)—3.7%.

EXAMPLE XVI

Telomerization of 1,3-Butadiene with Toluene

A. To 400 ml. of toluene was added 0.034 equivalents of the catalyst of Example VI and 5 ml. of TMEDA (catalyst concentration=0.08 N). Then 1,3-butadiene was added as a gas at a flow rate of 3.5 liters/minute. The temperature rose immediately from 25–60° and was maintained at 60-65° throughout the reaction with external cooling. After 3 hours, 2 ml. of H₂O were added. The telomeric product was stripped of toluene under reduced pressure. The product, a pale yellow, free-flowing (189 poise at 26°) liquid with a molecular weight (VPO) of 2220, weighed 765 g. (representing a yield of 50 lbs. per equivalent of catalyst). The microstructure of the resulting polybutadiene was determined by infra-red analysis to be as follows:

Percent vinyl _____ 55.0
Percent trans-1,4 _____ 45.0
Percent cis-1,4 _____ 0.1
Percent saturated structures _____ None B. By comparison with the above results, the following telomeric product was obtained using n-butyllithium alone.

To 400 ml. of toluene was added 3 ml. (0.034 moles) of concentrated n-butyllithium and 5 ml. of 1-dimethylamino-2-ethoxyethane (TMEDA yields similar results). Then, 1,3-butadiene was added as a gas at a flow rate of 5 liters/min. The temperature was raised to 65° and maintained at 60-65° with external cooling. After 2 hours, 2 ml. of n-butanol was added. The telomeric product was stripped of toluene under reduced pressure. The product, a yellow viscous oil with a molecular weight (VPO) 2130 weighed 410 g. (representing a yield of 27 lbs. per equivalent of catalyst). The microstructure of the resulting polybutadiene was determined by infra-red analysis to be as follows:

Percent vinyl _____ 68.9
Percent trans-1,4 _____ 7.6
Percent saturated (cyclic) _____ 23.5
Percent cis-1,4 _____ None

EXAMPLE XVII

Telomerization of 1,3-Butadiene with Toluene using a 1:1 Catalyst Complex Composed of n-Butyl-tert-Butoxymagnesium and n-Butylpotassium To 400 ml. of toluene was added 2.35 g. (0.017 moles) of solid di-n-butylmagnesium and 1.9 g. (0.17 moles) of potassium tert-butoxide. The mixture was stirred for 5 minutes to give a yellow, soluble catalyst complex,

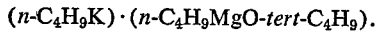

A volume of 2.5 ml. (0.017 moles) of N,N,N',N'-tetramethylethylenediamine (TMEDA) was added and 1,3-butadiene was then added as a gas at 3.4 liters per minute. The solution became a very deep red. The reaction temperature was kept at 60–65°. After 1 hour the reaction mixture ceased to take up the 1,3-butadiene. The mixture was then hydrolyzed with 2 ml. of water and the excess toluene was removed under vacuum to yield 800 g. of a dark yellow, mobile oil (viscosity=7.25 poise (24°)) with a molecular weight of 435. The yield of telomeric product was 23.5 kg. per equivalent of catalyst.

EXAMPLE XVIII

Telomerization of 1,3-Butadiene with Toluene using a 1:1 Catalyst Complex Composed of Di-sec-Butylmagnesium sec-Butylpotassium The procedure of Example XV was used essentially unchanged except that the catalyst system was a complex composed of 1 molar equivalent of di-sec-butylmagnesium and 1 molar equivalent of sec-butylpotassium, prepared by the reduction of di-sec-butylmagnesium with dispersed potassium metal in a mixture of hexane and heptane. The yield of telomeric product was 25 kg. per equivalent of catalyst.

EXAMPLE XIX

Polymerization of 1,3-Butadiene

Butadiene (10 g.), freshly dried, was distilled into a pressure bottle containing 31 ml. of cyclohexane. 2 mmoles of the catalyst of Example IX was added by injection and the mixture was heated at 60° for 16–20 hours. At the end of the period, a solid rubbery compound was present. The reaction was quenched with isopropanol and the solid was evaporated, leaving a solid rubbery polymer.

EXAMPLE XX

Polymerization of Isoprene

Isoprene (10 g.), freshly dried and distilled, was mixed with frozen cyclohexane (13 ml.) in a pressure bottle, and the bottle was sealed with a septum. 2 mmoles of the catalyst of Example IX was added by injection and the mixture was heated at 60° for 16–20 hours. At the end of the period, a solid rubbery compound was present. The reaction was quenched with isopropanol and the solid was evaporated, leaving a solid rubbery polymer.

What is claimed is:

1. A catalyst composition having utility in the preparation of (a) telomers and (b) polymers, comprising a liquid hydrocarbon solution of a complex of (i) at least one organometallic compound in which the metal is a Group IIa metal, with (ii) at least one organometallic compound in which the metal is a Group I metal, the organo radicals of said organometallic compounds being C₂–C₁₂ hydrocarbon radicals selected from the group of alkyl, cycloalkyl, aryl, alkylaryl, cycloalkylaryl, alkylene, and polyenes, and organo radicals seelcted from the group consisting of 2-pyridyl, 2-thienyl, vinyl, allyl and propenyl.

2. The catalyst composition of claim 1, in which the hydrocarbon solvent is at least one member of the group of pentane, hexane, heptane, octanes, cyclohexane, cyclooctane, benzene and toluene.

3. The catalyst composition of claim 2, in which the (i) organometallic compound is a dialkylmagnesium in which each alkyl contains from 3 to 6 carbon atoms.

4. The catalyst composition of claim 3, in which the dialkylmagnesium is selected from the group of di-$n$-butylmagnesium and di-$sec$-butylmagnesium.

5. The catalyst composition of claim 4, in which the (ii) organometallic compound is an alkyl alkali metal compound in which the alkyl contains from 3 to 6 carbon atoms.

6. The catalyst compound of claim 4, in which the alkyl alkali metal compound is selected from the group of $n$-butyllithium, $n$-butylsodium and $n$-butylpotassium.
metal is magnesium and in which the Group I metal is selected from the group of sodium, potassium and lithium.

7. A composition which is soluble in a liquid hydrocarbon solvent, comprising a mixture of organometallic compounds of at least two different metals one of which is selected from Group IIa and another of which is selected from Group I of the Periodic Table, the organo radicals of said organometallic compounds being $C_2$–$C_{14}$ hydrocarbon radicals selected from the group of alkyl, cycloalkyl, aryl and alkylaryl, at least one of said organometallic compounds being insoluble in a given liquid hydrocarbon solvent and at least one of said organometallic compounds being soluble in said given liquid hydrocarbon solvent.

8. A composition which is soluble in a liquid hydrocarbon solvent, comprising a mixture of $C_3$–$C_6$ alkylmetallic compounds of at least two different metals one of which is selected from Group IIa and another of which is selected from Group I of the Periodic Table, at least one of said alkylmetallic compounds being insoluble in a given liquid hydrocarbon solvent and at least one of said alkylmetallic compounds being soluble in said liquid hydrocarbon solvent.

9. The composition of claim 8, in which the alkyl radicals of said alkylmetallic compounds are selected from the group of butyl and amyl.

10. The composition of claim 9, in which the Group IIa metal is magnesium and in which the Group I metal is selected from the group of sodium, potassium and lithium.

11. A composition which is soluble in a liquid hydrocarbon solvent, comprising a mixture of (a) a compound represented by the formula $(R^1R^2)Mg$ and soluble in a given liquid hydrocarbon, and (b) a compound represented by the formula $R_3Me$, where Me is sodium, potassium or lithium and $R^1$, $R^2$ and $R^3$ are the same or different alkyls each containing from 3 to 6 carbon atoms, insoluble in said given liquid hydrocarbon solvent.

12. A composition according to claim 11, in the form of a binary alkylmetallic complex, said complex consisting of (a) a mixture of di-$n$-butylmagnesium and di-$sec$-butylmagnesium and (b) $n$-butylpotassium, the mole ratio of (a) to (b) being about 1:1.

13. A composition comprising a solution in a liquid hydrocarbon solvent of the composition of claim 12.

14. A composition which is soluble in a liquid hydrocarbon solvent, comprising (a) at least one compound from the group of di-$n$-butylmagnesium, di-$sec$-butylmagnesium, and di-$n$-amylmagnesium, and (b) at least one compound from the group of $n$- and $sec$-butylmetallics where the metal is selected from the group of sodium, potassium and lithium.

15. A catalyst composition having utility in the preparation of (a) telomers and (b) polymers, comprising a binary hydrocarbon-soluble complex of an alkyl-alkoxy magnesium with an alkylmetallic of a Group I metal, made by admixing a dialkylmagnesium with an alkali metal alkoxide in a liquid hydrocarbon solvent and recovering the resultant solution of the complex.

16. The catalyst composition of claim 15, in which the dialkylmagnesium is a dibutylmagnesium and the alkali metal alkoxide is a sodium, potassium or lithium $tert$-butoxide.

17. In a method of preparing a catalyst having utility in the preparation of (a) telomers and (b) polymers, the steps which comprise reacting, under conditions of agitation, in a liquid hydrocarbon medium, finely divided magnesium metal with a $C_4$–$C_{12}$ alkyl chloride to produce a primary dialkylmagnesium and byproduct magnesium chloride, then adding to said reaction mixture a secondary or tertiary alkylmetallic of a Group I metal in an amount equivalent to from 5% to 100% of the primary dialkylmagnesium which reacts with the said byproduct magnesium chloride, and then complexing the same with a $C_4$–$C_{12}$ alkylmetallic compound in which the metal is a Group I metal.

18. The method of claim 17, in which the complex formed is a binary hydrocarbon-soluble organolithium-diorganomagnesium complex and wherein the $C_4C_{12}$ alkylmetallic compound is an alkyllithium and is added in an amount substantially sufficient to react with all of the byproduct magnesium chloride and also to form a complex with the prepared dialkylmagnesium, then filtering to separate a solution of the complex from the solids, the alkyllithium to diorganomagnesium ratio in said complex ranging from about 0.5 to about 2 moles of the alkyllithium to 1 mole of the diorganomagnesium.

19. The method of claim 17, in which the complex formed is a binary hydrocarbon-soluble organosodium-diorganomagnesium complex and wherein the $C_4$–$C_{12}$ alkylmetallic compound is a solid alkylsodium.

References Cited

UNITED STATES PATENTS

| | | | |
|---|---|---|---|
| 3,646,231 | 2/1972 | Kamienski et al. | 260—665 R |
| 3,542,111 | 6/1969 | Kamienski et al. | 260—665 R |
| 3,452,112 | 6/1969 | Kamienski et al. | 252—434 |

OTHER REFERENCES

Seitz et al., J. Amer. Chem. Soc. Vol. 88, pp. 4140—4147 (1966).

Kamienski et al., Diss. Abstracts B, pp. 107B–108B (1968).

HELEN M. S. SNEED, Primary Examiner